US005711886A

United States Patent [19]

Long

[11] Patent Number: 5,711,886
[45] Date of Patent: Jan. 27, 1998

[54] APPARATUS AND METHOD FOR PREVENTING MOLLUSK INFESTATION IN RESIDENTIAL WATER SYSTEM

[76] Inventor: John Turner Long, 2011 Gibbs Rd., Penn Yan, N.Y. 14527

[21] Appl. No.: 665,733

[22] Filed: Jun. 17, 1996

Related U.S. Application Data

[63] Continuation-in-part of Ser. No. 491,724, Jun. 19, 1995, abandoned.

[51] Int. Cl.⁶ .................................................... C02F 37/00
[52] U.S. Cl. ........................... 210/747; 210/170; 210/769; 210/510.1
[58] Field of Search .............................. 210/747, 170, 210/767, 510.1

[56] References Cited

U.S. PATENT DOCUMENTS

705,364   7/1902   Kurtz .
2,024,646  12/1935  Jones .
4,133,761  1/1979   Posgate .
4,744,896  5/1988   James et al. .
4,874,516  10/1989  Kondo .
5,252,206  10/1993  Gonzalez .
5,253,954  10/1993  Landsberger .
5,256,310  10/1993  Brooks .
5,294,351  3/1994   Clum et al. .

Primary Examiner—Neil McCarthy
Attorney, Agent, or Firm—Banner & Witcoff, Ltd.

[57] ABSTRACT

An apparatus and method for controlling mollusk infestation, and particularly zebra mussel infestation, in residential water systems by use of a ceramic filter. The ceramic filter has pores, each of which has a width less than the size of zebra mussel veligers. The ceramic filter is preferably cylindrical in shape and fastened to the interior wall of a submerged protective containment housing. The submerged containment housing supports one or more filters and provides protection from external threats. The filters are directly connected to the residential water system whereby water can be drawn through the means of a vacuum created by whatever apparatus is employed by the residential water system.

5 Claims, 7 Drawing Sheets

APPARATUS AND METHOD FOR PREVENTING MOLLUSK INFESTATION IN RESIDENTIAL WATER SYSTEM

This application is a continuation-in-part of U.S. patent application Ser. No. 08/491,724, filed Jun. 19, 1995, abandoned.

FIELD OF THE INVENTION

The present invention relates to a new, economical and environmentally friendly method to prevent mollusk infestation, and particularly zebra mussel infestation, in residential water systems drawing water from rivers, lakes, ponds and streams contaminated with zebra mussels or other mollusks.

BACKGROUND OF THE INVENTION

*Dreissena Polymorpha*, commonly known as zebra mussels, are indigenous to Europe and, prior to 1988, were unknown in the waters of the United States and Canada. It is theorized that a foreign ship emptying its ballast introduced the zebra mussels to the waters of Lake St. Clair from which they spread into the Great Lakes, particularly Lake Erie and Lake Ontario, and have gone so far as the Ohio and Tennessee river systems. Biologist believe that the zebra mussel will in all likelihood ultimately infest most areas south of central Canada and north of the Florida panhandle, from the Pacific coast to the Atlantic coast in as few as 20 to 25 years. Prolific breeders, a single female zebra mussel may lay some ten thousand to two million eggs per year. An extremely hardy and resilient organism, the zebra mussels have few natural predators and can survive out of water for substantial periods of time, up to 14 days, merely requiring moist or humid areas in which to exist.

They have a four to eight year life cycle comprising four stages: the fertilized egg stage lasting about two to three days; the veliger or larvae stage lasting about two to three weeks; the settling stage; and the adult stage which begins at about twelve months. In the veliger stage, the zebra mussels present the greatest problem. Zebra mussel veligers hatch from eggs at a size of approximately 70 microns (0.00275 inch). In this stage, they are a free swimming planktonic larva which may disperse for miles and are small enough to enter into residential water systems which draw their water supply from the zebra mussel-contaminated river, stream, pond or lake. Both shallow and deep intakes are affected since zebra mussels generally colonize from 2 feet of the water surface down to depths of 200 feet or more.

In the settling stage they are visible to the eye and possess visceral threads, known as byssus, which cling to or attach to almost any solid stationary surface in areas having low velocity currents, e.g., less than approximately seven feet per second. They can attach to a variety of surfaces including metal, concrete, plastic and polytetrafluoroethylene. In the settling stage, they attempt to attach or connect onto such surfaces, and if a clear surface is not available, they will climb on top of others that are so attached. In this manner, they colonize residential pipes and other intake systems whereby they can block the free flow of water.

A blocked pipe must be cleaned at considerable cost and inconvenience to the residential owner. The seriousness of the problem is described in the "Second International Zebra Mussel Research Conference" held in Rochester, N.Y., on Nov. 19–22, 1991. More than three hundred registrants including research biologists, university students, consultants, end-users, and product and service representatives attended this conference.

The primary use of residential water systems is to provide fresh water for household needs, such as drinking, cleaning, bathing, and cooking. While power plants and other large scale users of fresh water taken from the rivers and lakes were the first to encounter the costs associated with removal of zebra mussels from their water intake systems, residential water systems have by no means escaped, and in fact, are less capable than large scale water users to deal with zebra mussel infestations. Conservative estimates place the number of private dwellings with threatened water systems in the eastern half of North America at more than 100,000. Water intake structures (pipes and their supporting crib work) serve as an excellent habitat for zebra mussel colonization because the continuous flow of water into the pipes brings in a continuous source of food and oxygen, and carries away waste. The structure also protects the mussels from environmentally hazardous conditions such as storms.

Since layers of zebra mussels have been observed up to two feet thick blocking the pipes in large public facilities, the mussels will have no trouble fouling the typical one to two inch diameter residential pipe. Once in a water intake line, zebra mussels can colonize any part of the system from the mouth of the intake in the lake or river to the distribution pipes within the residence. Zebra mussel colonization can lead to lost pumping efficiency, obstruction of foot valves, putrification of decayed mussel flesh, production of obnoxious tasting and foul smelling methane gas, and increased corrosion of steel, iron and copper pipes. Extensive research and development is being conducted regarding the zebra mussel problem in an effort to provide solutions which are cost effective and environmentally acceptable.

Attempts to control the zebra mussel problem have included to date: chemical treatment, primarily by injection of chlorine and bromine into the water to discourage veliger settlement; mechanical cleaning, by water blasting and scraping of the walls in the intake structures and large piping, and vacuuming out the removed zebra mussels; coating the pipes with a silicone or other antifouling coating; use of biological mollusk poisons, acoustic energy, shoreline cisterns and shore wells; and a variety of sand filtration for offshore controls. Large power facilities have used methods involving the recirculating of warm water from the condenser and raising its temperature to between 95° and 100° F., and holding that temperature for about thirty minutes to kill the zebra mussels on the screens, grates and tunnels within the plant. In another method employed by large facilities, the water is heated by limited application of electrical resistance or steam heating the piping sections.

As discussed at the Second International Zebra Mussel Research Conference, and highlighted in a paper entitled, "Responding to Zebra Mussel Threat-A Case History" by T. C. McTighe et al., methods for controlling zebra mussel infestation may be categorized as ecological, biological, mechanical, and chemical. All of these known methods are of only limited value, and more importantly, are far too costly for the average residential owner. (Indeed, only the large scale water use facility can afford some of the techniques.) Building wells, cisterns, and sand filtration methods, for example, are extremely costly endeavors and beyond the financial resources of most residential owners. Moreover, many of these methods, such as the chemical treatment and thermal treatment approaches, have environmental implications. Introduction of in-the-lake sand filters can lead to the temporary degradation of localized water quality due to an increase in turbidity brought on by excavation and backfilling as well as being extremely expensive. The thermal method continually raises the water temperature such that the hot water, due to environmental regulations, cannot be released back into the lakes or rivers. Regulations set a maximum temperature at which the water may have on reentry into the lake and river system to prevent damage to existing marine life. Additionally, there are limitations on chemicals and other pollutants that may be exhausted into the rivers and lakes. Unlike large scale users, most residential owners cannot afford to install a water system with multiple redundant intake pipes. Thus, the present methods of controlling the zebra mussel problem are of limited value and research continues to find better methods.

SUMMARY OF THE INVENTION

It is a primary object of the present invention to provide an improved method of controlling and preventing the entry of zebra mussels and other mollusks into residential water systems. The objects and advantages of the present invention are:

a. to provide an economic and cost-effective method to prevent the infestation and colonization of zebra mussels and other mollusks in residential water systems through the means of a submerged filtering device;

b. to provide an uncomplicated and easily administered method to prevent the infestation and colonization of zebra mussels and other mollusks in residential water systems through the means of a submerged filtering device;

c. to provide an environmentally non-intrusive and safe method to prevent the infestation and colonization of zebra mussels and other mollusks in residential water systems through the means of a submerged filtering device; and d. to provide a submerged housing for the filtering device which will not create an underwater hazard and permits easy, accessible and economic servicing.

To accomplish these objects and provide these advantages, I have invented a filtering device designed to filter out the zebra mussels or other mollusks at all stages of their life cycles. With a particular emphasis on zebra mussels, the filter is designed to filter particles of less than 70 microns, and preferably down to 50 microns in size. This filtering device is essentially composed of a ceramic material, such as alumina. In a preferred embodiment, one or more filters are housed in a submerged structure for protection. The structure is provided with ample openings through which water can be drawn. The outer housing permits easy access to the filtering devices to allow ready servicing, maintenance and cleaning. In short, the present invention provides a non-complicated and economical method and apparatus to prevent zebra mussels or other mollusks from infesting and colonizing and so harming residential water systems. Still further objects and advantages will become apparent from the ensuing description and drawings.

DESCRIPTION OF THE PREFERRED EMBODIMENT

In the present invention, a ceramic filter 10 is employed to prevent zebra mussels or other mollusks from infesting and colonizing a residential water system (FIGS. 1–4). Although the focus of the invention is on protecting residential water systems, the invention may also be employed to protect commercial water systems which have water demands and pipe sizes suitable for use with the present inventive filters.

Filters 10 are composed of a ceramic material which is preferably molded by known processes to form a rigid, continuous member having pores extending therethrough. The pores are each formed to have a diameter which is smaller than the zebra mussel or other mollusk during any stage of its life cycle, and large enough to permit an ample flow of water to pass into the water system. In the preferred embodiment the filter is composed of alumina, although other ceramic materials could be used. The alumina filter may also preferably include burnt aluminum shavings and other particles as is known in the industry.

The ceramic filter 10 is a rigid member with seemingly solid walls. The walls, however, are formed with a vast array of pores through which water is drawn from the body of water forming the contaminated source. To provide an effective barrier in preventing zebra mussel infestation each pore should preferably be smaller than 70 microns in diameter (i.e., the approximate size of zebra mussel veliger). However, in the most preferred embodiment, the filter pores are each no larger than 50 microns in size to provide a suitable safety margin. Nevertheless, pores as large as 100 microns is believed to be effective in preventing zebra mussel infestation. The zebra mussel veligers attempting to pass through pores of this size are believed to be shredded due to the roughness of the ceramic material. The pore sizes may, of course, be varied as needed to prevent the infestation of other mollusks. Finally, the majority of the pores should be no smaller than about 30 microns avoid premature clogging of the filters and to ensure an ample flow of water to the water system without undue resistance. In the preferred construction the pores range from about 30 to 50 microns in width.

Figure 3:
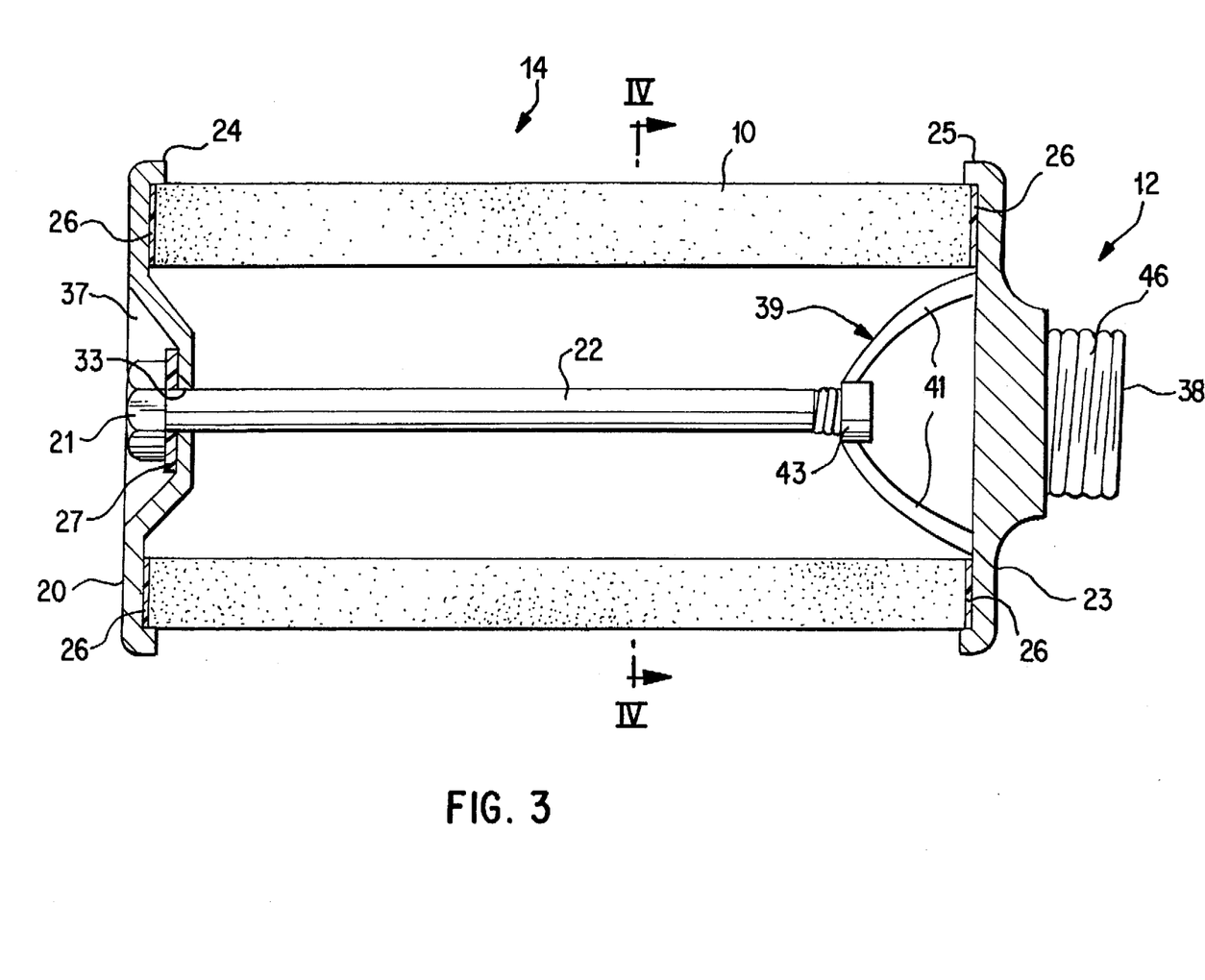
FIG. 3 is a sectional view of a filter device in accordance with the present invention.

In the preferred construction, the ceramic filter is made into a cylindrical shape to present a large surface area but still occupy a small space; although other shapes could of course be used. The filter is supported by a frame 12 to define a filter device 14. The frame 12 for each filter device 14 preferably comprises four parts: a cap 20, a nut 21, a bolt 22, and a base part 23 (FIG. 3). The frame parts are preferably composed of stainless steel, although other materials suitable for use in water and as part of an intake water system could be used.

In a preferred example, ceramic filter 10 is 17 inches long and formed with a 4 inch external diameter. The walls of the filter are one inch thick to define an internal diameter of 3 inches. A cap 20 and a base part 23 are fit onto opposite ends of filter 10. Cap 20 and base part 23 are each fitted on filter 10 by means of lipped edge 24, 25, respectively, that is 0.5 inches wide. Cap 20 and base part 23 are interconnected by a central bolt 28. Cap 20 has a hole 33 at its center through which bolt 28 extends. Nut 21 fastens to the end of bolt 22 to hold restraining cap 20 in place atop filter 10. Seals 26 are provided between filter body 10 and cap 20 and base part 23 to prevent the ingress of filtered water into water system 40. Similarly, a seal 27 is provided between nut 21 and cap 20. A depression 37 may be formed about hole 33 to receive nut 21, but is not necessary. Bolt 22 is 16.5 inches long and ⅝ inches wide and screws into base part 23. Of course, bolt 22 could be attached in other ways (e.g., welding) or otherwise formed integrally with base part 23.

Figure 4:
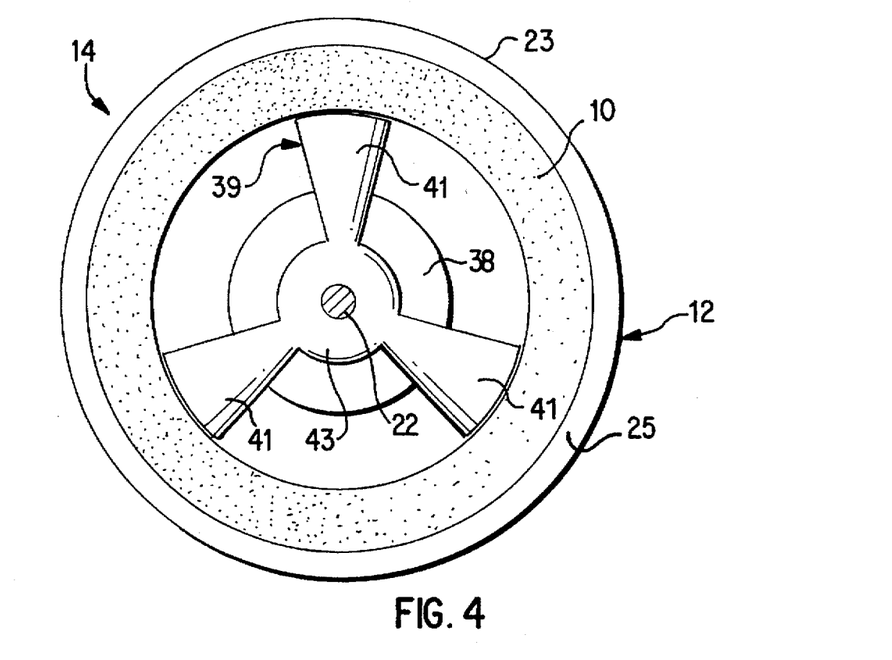
FIG. 4 is a cross-sectional view taken along line 4—4 in FIG. 3.
Figure 5:
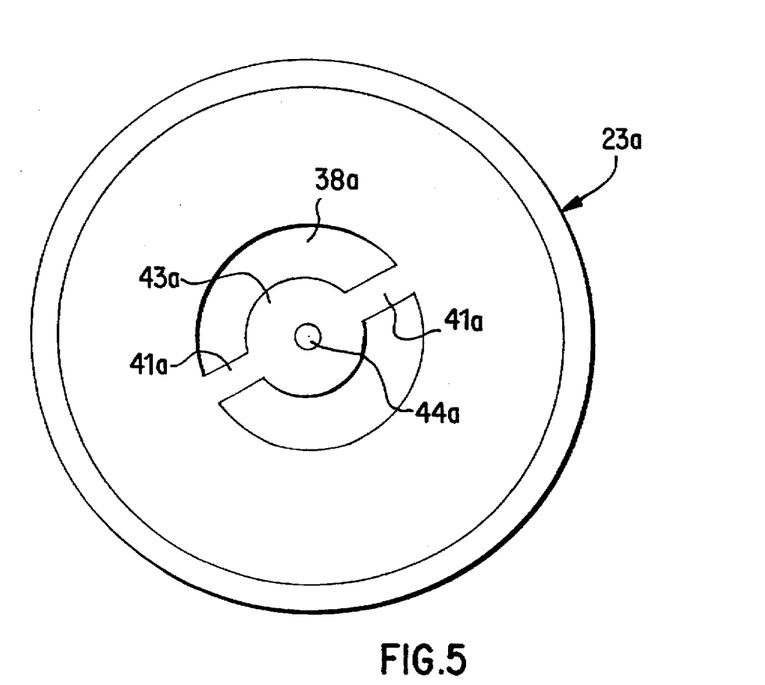
FIG. 5 is an interior view of an alternative base part of the present invention.

In the preferred example, base part 23 includes a two inch outlet port 38 through which water flows into the water system 40 (FIGS. 3–4). The interior side of base part 23 forms a support 39 into which bolt 22 can be screwed (FIG. 3). Support 39 is formed as a plurality of arms 41 (e.g., three one-inch arms) which intersect at a hub 43 in which is provided a threaded bore 44 to threadedly receive and retain bolt 28. As can be appreciated, arms 41 permit water which has passed through filter 10 to flow to outlet port 38. Alternatively, base part 23a preferably includes a pair of arms 41a which extend diametrically across outlet port 38a, in place of raised arms 41, to form a central hub 43a provided with a threaded bore 44a for receiving a bolt 28a (FIG. 5). The exterior side of base part 23 includes a hollow, threaded shank 46 which defines port 38, and is adapted to be secured to a fitting 48 to connect the filter device 14 to piping 50 for water intake system 40.

Figure 1:
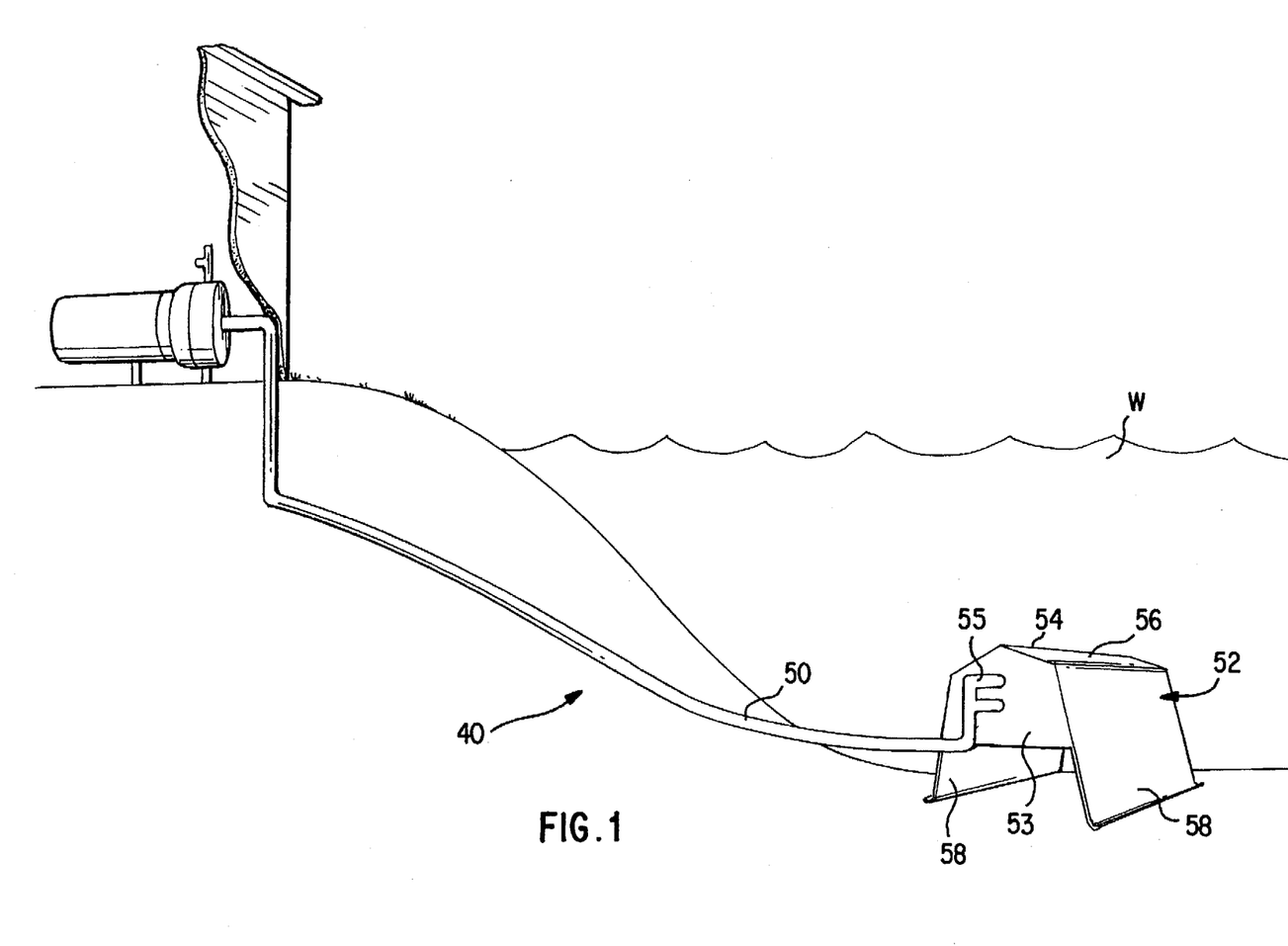
FIG. 1 is a perspective view of a residential water intake system which includes filtering means in accordance with the present invention.
Figure 2:
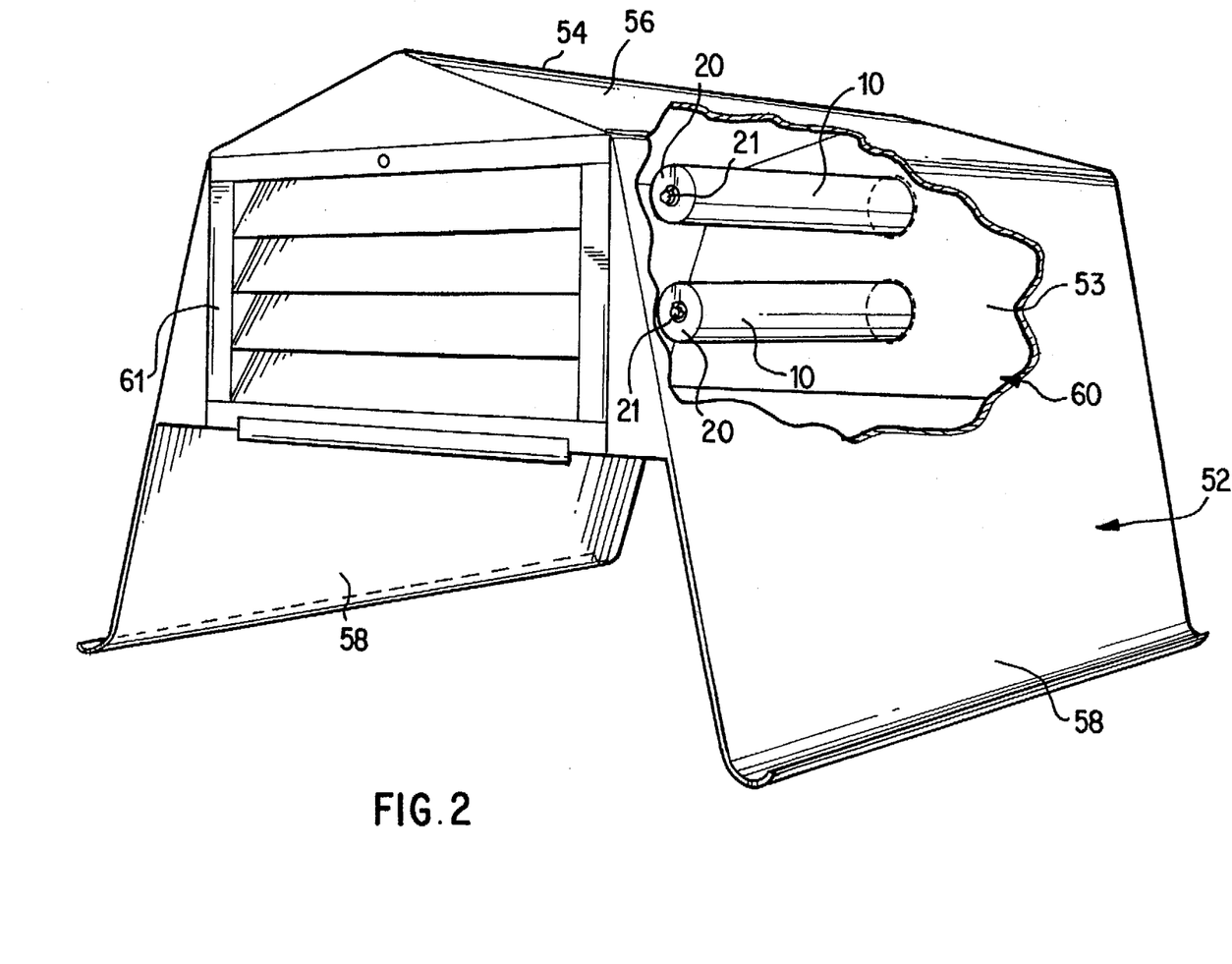
FIG. 2 is a perspective view of a filtering system of the present invention with a housing which is partially cut away to show the enclosed filter devices.
Figure 7:
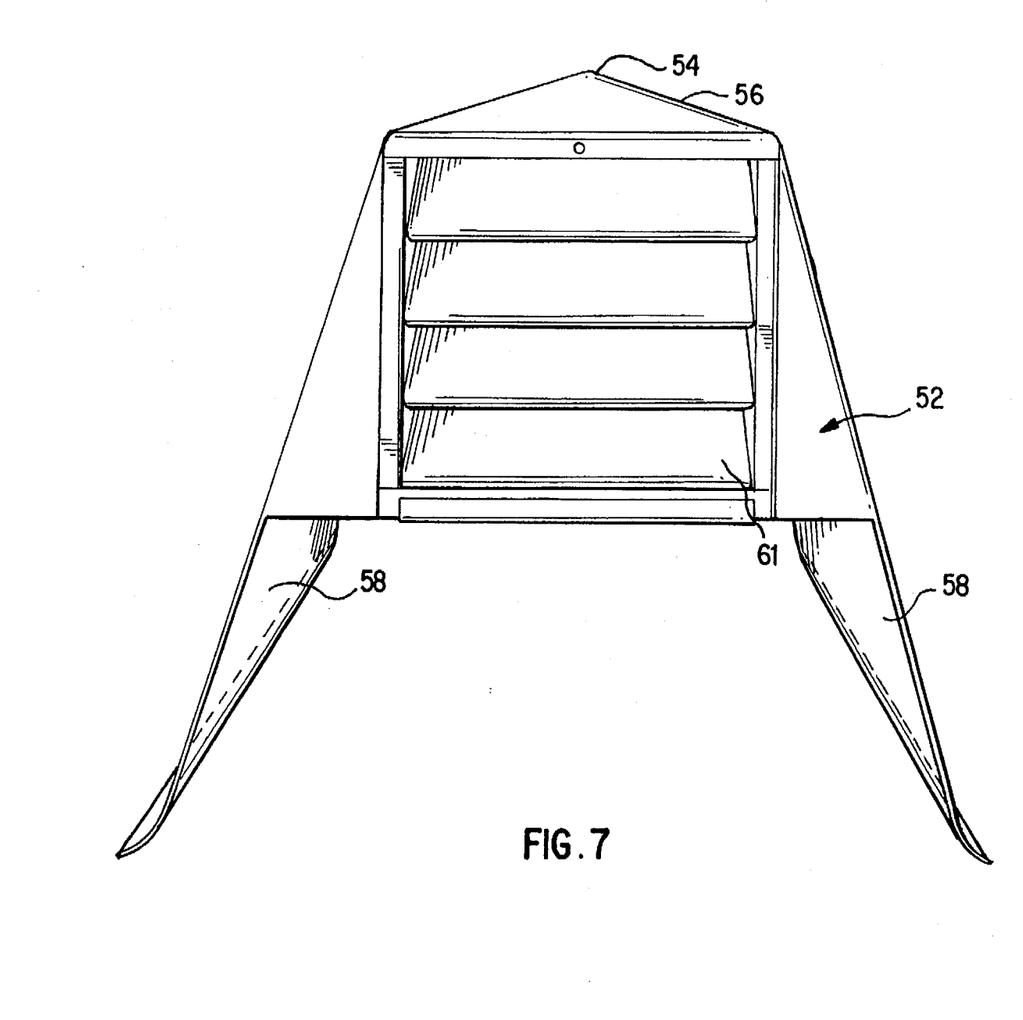
FIG. 7 is a rear view of the housing.

In a typical embodiment, one or more filter devices 14 are mounted within a housing 52 set under the surface of the water W, such as on the bottom of a lake, pond, stream or river (FIG. 1). In this embodiment, fittings 48 are mounted in the rear wall 53 of housing 52 (FIG. 7). As illustrated, a pair of filters 10 are connected to piping 50 via a manifold 55 (FIG. 1). If a different number of filters is desired, a different manifold with the appropriate number of branches can be used.

Figure 6:
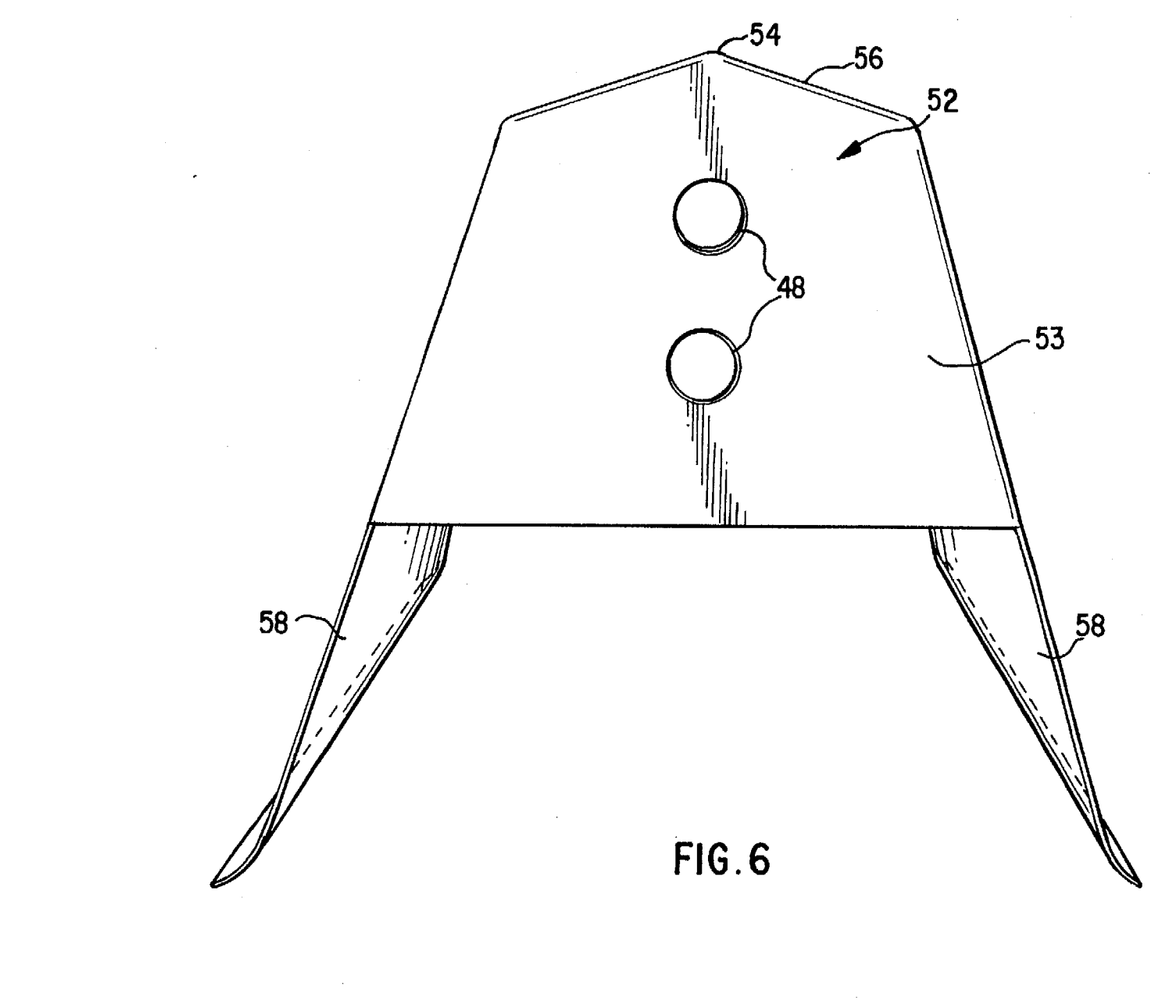
FIG. 6 is a front view of the housing enclosing the filter devices in accordance with the present invention.

Housing 52 is preferably constructed of 14 gauge steel but can be made of other suitable materials such as aluminum or plastic (FIGS. 1, 6 and 7). In a preferred example, the apex 54 of the roof 56 of housing 52 to the bottom of the lake, stream or river where it stands, measures 23 inches in height. The housing 52 has leg supports 58, measuring 21 inches, running the length of each side of outer housing 10. The two legs are oriented at an angle of 80 degrees from the bottom on which they stand. The roof structure 56 of housing 52 is shaped like an isosceles triangle having two sides 6 inches long and a base 10.75 inches long. The housing forms a protective containment area 60 for shielding the filters 10 from harm. The bottom is preferably open, but may be formed of a perforated plate if desired. At the front of protective containment area 60 is a pivotally mounted louvered gate 61.

In operation, water is drawn through the louvered gate 61 and the bottom of containment area 60 to filters 10. An ordinary jet pump, such as a one-third horse power pump manufactured by Goulds Pumps of Seneca Falls, N.Y., can create the necessary vacuum to draw the water. This same vacuum continues to draw water through ceramic filter 10 which in turn leads to the residential water system. Housing 52 allows water to flow in while protecting the heart of the system, ceramic filters 10, from external harm such as those posed by boats, fishermen, or environmental hazards such as storms. Housing 52 will further function to help alleviate larger debris from blocking or damaging the filters.

The interior of protective containment area 60 as well as the filter device 14 requires periodic cleaning (e.g., annually). Cleaning and maintenance can be easily accomplished by entering through the opened louvered gate or through the bottom of housing 52. With this arrangement, each filter device 14 can be easily accessed and removed for servicing, maintenance or replacing by merely unscrewing from fittings 48. The filters 10 can be removed from the frames for cleaning and/or replacement. The filters are also cleaned on a frequent basis (e.g., daily) by backflushing the water in the reverse direction through the filters.

In an alternative embodiment (FIGS. 8–10), a water intake system utilizes a submersible pump 70, such as a ½ horsepower, 220 volt pump, manufactured by Goulds Pumps of Seneca Falls, N.Y. A submersible pump 70 is mounted in the source of water W with a filtering system 72. The use of a submersible pump not only reduces noise within the residence, but may also be useful in locations having a large vertical rise from the filter to the residence.

Figure 8:
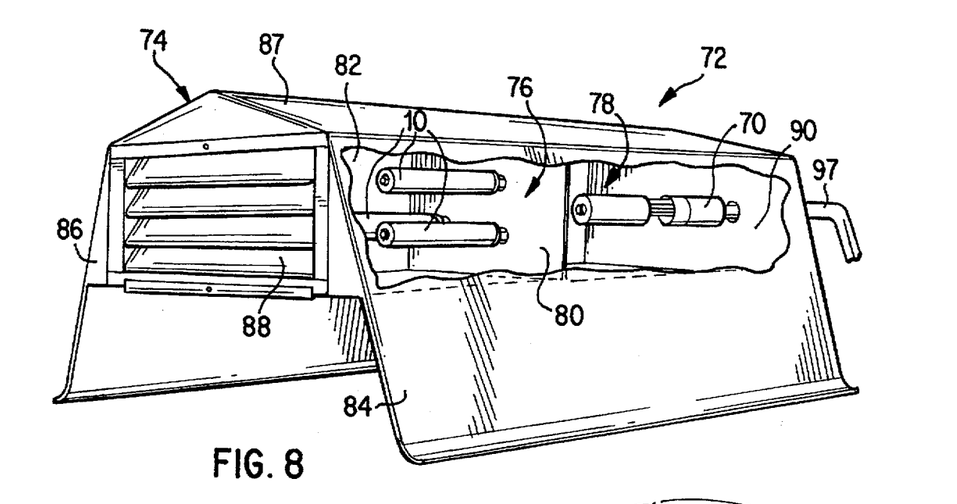
FIG. 8 is a perspective view of a second embodiment of a filtering system in accordance with the present invention with a housing which is partially broken away.
Figure 9:
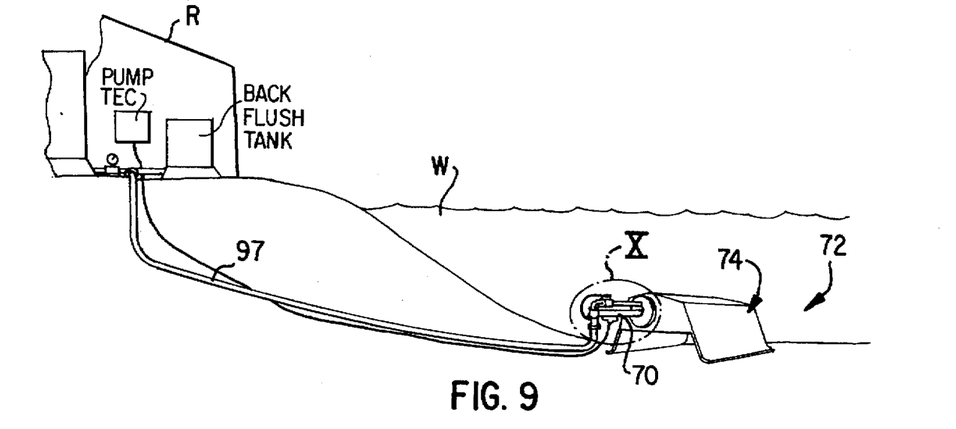
FIG. 9 is a perspective view of a residential water intake system using the second embodiment of a filtering system.
Figure 10:
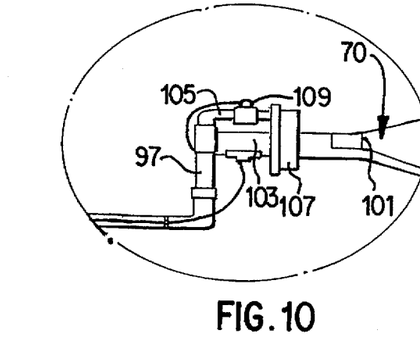
FIG. 10 is an enlarged partial side view of the filtering device encircled by line X, with the rear wall omitted.

In this embodiment, a plurality of filters 10 are contained within a housing 74 subdivided into two chambers 76, 78 by a partition 80. Front chamber 76 is defined by sidewalls 82, 84, front wall 86, partition 80 and roof 87, but is open along its bottom. Chamber 76 is in fluid communication with the source of water W via the open bottom and the louvered gate 88. Filters 10 are mounted into threaded fittings secured in partition 80. Rear chamber 78 is defined by sidewalls 82, 84, partition 80, rear wall 90, roof 87, and bottom panel 92. Chamber 78 is thus closed to the source of water W except by passage of water through filters 10. A submersible pump 70 extends into chamber 78 from rear wall 90, wherein it is secured by a suitable mount (not shown). The pump 70 is coupled to piping 97 for transmission of the filtered water to the residence R. As water is pumped from chamber 78 to residence R, water is drawn from front chamber 76 through filters 10. At the rear end 101 of pump 70, piping 97 is branched into two pipe segments 103, 105. Segment 103 interconnects pump 95 with piping 97, and segment 105 interconnects piping 97 directly with rear chamber 78 through seal 107 mounted in rear wall 90. Segment 105 includes a valve 109 which opens only during backflushing.

The present invention represents an economical, environmentally safe and effective means to prevent and control zebra mussel (or other mollusk) infestation in residential water systems through the means of a submerged filtration system contained in a protective housing. Numerous alterations of my invention will suggest themselves to those skilled in the art. However, it is to be understood that the present disclosure relates to the preferred embodiment of the invention which is for the purposes of illustration only and not to be construed as a limitation of the invention. As such, the components of the invention can have different sizes, shapes and materials than those that are disclosed. All such modifications which do not depart from the spirit of the invention are intended to be included within the scope of the appended claims.

I claim:

1. A process for preventing dreissena species infestation of a water intake system having piping for transporting water from at least one intake port in a source of water containing the dreissena species to a predetermined location, said process comprising providing a ceramic body having pores extending therethrough for the passage of water, each said pore having a width which is within the range of approximately 30–100 microns, and placing said ceramic body over said intake port so that all of the water entering said piping must pass through said ceramic body to prevent the dreissena species from entering the piping.

2. A process in accordance with claim 1 in which the dreissena species being filtered are zebra mussels.

3. A process in accordance with claim 1 in which each said pore has a width which is less than 70 microns.

4. A process in accordance with claim 1 in which each said pore has a width which is less than 50 microns.

5. A process in accordance with claim 1 in which said provided ceramic body is substantially composed of alumina.

* * * * *